United States Patent [19]

Kiss

[11] 4,198,460

[45] Apr. 15, 1980

[54] FIBRE MAT FOR THE DRY PRODUCTION OF COMPRESSED MOULDINGS

[75] Inventor: Günter H. Kiss, Berlin, Fed. Rep. of Germany

[73] Assignee: KCE Kiss Consulting Engineers Verfahrenstechnik GmbH, Berlin, Fed. Rep. of Germany

[21] Appl. No.: 921,123

[22] Filed: Jun. 30, 1978

[30] Foreign Application Priority Data

Jul. 5, 1977 [DE] Fed. Rep. of Germany ....... 2730750

[51] Int. Cl.[2] ....... B32B 7/00

[52] U.S. Cl. ....... 428/284; 428/174; 428/282; 428/511

[58] Field of Search ....... 428/280, 282, 284, 297, 428/298, 198, 511, 174

[56] References Cited

U.S. PATENT DOCUMENTS

| | | | |
|---|---|---|---|
| 3,001,902 | 9/1961 | Cooke et al. | 428/246 |
| 3,755,051 | 8/1973 | Stumpf | 428/198 |
| 3,765,997 | 10/1973 | Dunning | 428/198 |
| 4,045,603 | 8/1977 | Smith | 428/511 |
| 4,061,819 | 12/1977 | Barnes | 428/218 |

*Primary Examiner*—James J. Bell

*Attorney, Agent, or Firm*—Weingarten, Maxham & Schurgin

[57] ABSTRACT

A fibre mat of ligno-cellulose fiber layers bonded to a deformable support layer. The support layer is formed of intersecting discrete filaments in a loop configuration where the planar or shear-deformability of the support layer is substantially matched to the fiber layers. The invention also includes the method for making the fiber mat.

8 Claims, 2 Drawing Figures

Figures 1, 2:
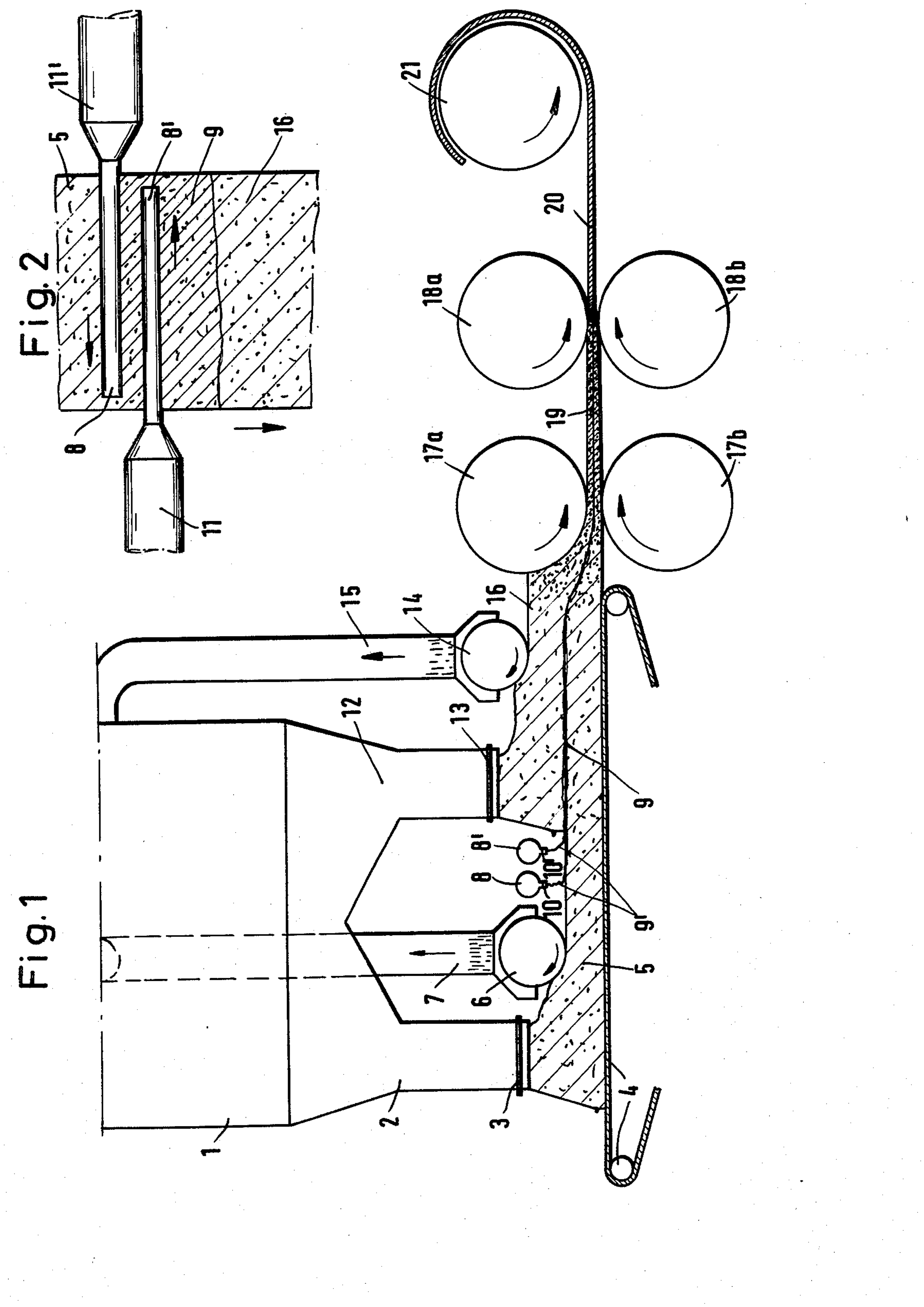

1
2
3
4
5
6
7
8
8'
9
9'
10
10'
11
11'
12
13
14
15
16
17a
17b
18a
18b
19
20
21

FIBRE MAT FOR THE DRY PRODUCTION OF COMPRESSED MOULDINGS

This invention relates to a fibre mat for the dry production of compressed mouldings, consisting of pre-compacted cellulose, more particularly ligno-cellulose fibre layers, which are bonded to a deformable support layer. The invention also relates to a method of making the mats.

For the purpose of making compressed mouldings from ligno-cellulose fibre materials it is known to apply fibres, to which small quantities of binders have been added, to an endless conveyor, adjust the height of the applied fibre layer by means of a peeling roller, and compact the fibre layer, if necessary, between pairs of rollers (DAS No. 12 24 919).

The resulting endless strand is then divided up into individual panels by means of a suitable cutter, mouldings being cut and compressed from these after intermediate transport and, if necessary, steaming.

A method of making mouldings from ligno-cellulose fibre material is already known (DOS No. 14 53 416), in which pre-compacted fibre mats are steamed and a reinforcing fabric is applied to the steam-treated fibre panel which is then pressed tightly into the fibre mat under a specific pressure and at a specific temperature. The reinforcing fabric may consist of coarse cloth or paper fabric. In another method described there, a fabric is applied to the endless fibre mat and is pressed into the latter by means of two superposed rollers. The fabric may be coated with a thermoplastic or a duroplastic before application. The main disadvantage of this method is that the mats, which may be produced in endless form, substantially lose their deformability because of their constant thickness as they pass through the rollers and as the fabric is consolidated, while in addition the pre-compressed bond is largely destroyed by the steaming of the fibre materials before they are compressed to form mouldings. Consequently, the actual compression process in the production of hollow articles causes considerable relative movements of the discrete fibres, which are thus pulled out of the original bond. Weakened zones and cracks in the mouldings are the result.

DAS No. 23 64 025 proposes improving the deformation properties of fibre panels by providing a support layer between two ligno-cellulose fibre layers, so as to adhere thereto, the pre-compressed fibre mat having a plurality of regularly distributed zones of reduced cross-section. The support layer is required to be deformable, and in DAS No. 23 64 025 this is achieved by making the support layer from elastic material (prefabricated elastic sheets or evenly-distributed elastomers, which are applied in the liquid state and which also yield elastic sheets after curing).

Although fibre mats of this kind have improved shaping properties, they still have some disadvantages.

The extensibility of the elastic support layer is greater than the extensibility of the fibre layers. Cracks may therefore occur in the fibre layer on deformation of the mats, particularly during the production of pre-mouldings without additional heat supply.

If the elastic support layers are applied in flat layers in the form of liquid elastomers, a certain layer thickness must be maintained to obtain homogeneous extension properties of the support layer. This leads to increased need for expensive support layer material, so that the mat production is rendered expensive.

Even if ready-made sheeting is used for the support layer, a relatively considerable amount of material is required and it is also necessary to apply expensive adhesives over large areas.

An object of this invention is to provide a fibre mat of the kind described which can be subjected to greater deformation than prior art mats without impairing the uniform fibre distribution, and which can be made at reduced cost.

To this end, according to the invention, the support layer consists of intersecting discrete filaments which are interconnected at the intersection points, in such manner that the deformability of the support layers is determined by the sum of the deformation of its individual loops.

In a support layer constructed in this way, the elastic deformation is replaced by shear deformation possibilities for the individual loops. This corresponds to the deformability of fibre layers under pre-moulding in the steamed state very much better than the deformation of elastic support layers, since although the fibres of the mat are satisfactorily displaceable with respect to one another without breaking the fibre bond, local elongation of the kind occurring in the deformation of an elastic support layer may result in the fibres being pulled out of the mat and hence cracking. Consequently, this gives the appreciable advantage that the total deformability of the fibre layer can be adjusted to prevent local failure of the complete mat during shaping. In addition, the high-grade support material requirements are reduced. This is possible without impairing the mat properties, because the fibre layers can in our case take only very small tensile forces during deformation and so the support layer is not required to have any great tensile strength.

Bonding of the discrete filaments of the support layer at the points of intersection can be carried out by gluing or welding. Alternatively, frictional forces between the fibres can be additionally used (felting). Fibres with a rough surface are particularly suitable for this. Individual fibres of the mat can be included in the felting of the filaments and improve the adhesion of the filaments of the support layer at the points of intersection.

Another advantage is that the deformation properties of the support layer can be influenced over a wide range by the loop width, loop shape and filament thickness, and they can therefore be better adapted to the deformation properties of the fibre layers, so that the deformation properties of the complete fibre mat are greatly improved.

If the support layers are made with different loop shapes and sizes, the properties of the mat can be individually adapted to any particular deformation problem. There is also the additional possibility of making the support layer from filaments of differnt thicknesses. This also gives further adaptability to any specific production problem.

In one method of making fibre mats according to the invention, prefabricated support layers of suitable loop size, loop shape and filament thickness are used, and are then coated with an adhesive, e.g. a self-adhesive finish.

It is also very advantageous to make the described mats in a single continuous dry method in which during the mat production the discrete filaments of the support layer are drawn from feed reels, are taken through an impregnating apparatus containing an adhesive, and fed to filament guides movable in groups, the filament guides performing periodic transverse movements with respect to the direction of the mat feed. As a result, the discrete filaments of the support layer overlap in crossed relationship, bonding between the fibres of the mat and the bonding of the discrete filaments at the points of intersection being both effected by the adhesive.

In an advantageous development of the dry method according to the invention, the discrete filaments of the support layer are made from thermoplastic by means of an extruder and a plurality of spinnerets. If the spinnerets are moved during extrusion, overlapping filament loops of hot thermoplastic filaments can be made in co-operation with the mat feed and these loops are welded together at the points of intersection and thus form a support layer having planar or shear-deformable loops. Since the hot thermoplastic filaments are applied directly to the bottom fibre layer and are then immediately covered with the top fibre layer, no additional adhesive is required because the hot thermoplastic filaments bond to the fibres and are thus included in the mat formation process.

In one advantageous embodiment of the method, the spinnerets are disposed in lines along a spinneret bar, the hollow spinneret bar supplying the thermoplastic material from the extruder to the spinneret nozzles.

The loop shape and loop width are predetermined by the movement of the spinneret bar. If the spinning system for the support layer consists of a plurality of spinneret bars, they can be moved periodically transversely with respect to the mat feed, with a phase shift between the movements of the individual spinneret bars. It is particularly advantageous to move the spinnerets in the form of a circle to ensure good overlapping of the filament ejection. If required, filament ejection can be improved by making the spinneret bars perform a pivoting movement about their longitudinal axis in addition to a movement in parallel relationship to the fibre mat plane.

If the amplitude and/or frequency of the spinneret movement are varied per unit of time, the loop width and loop shape of the support layer can be individually adapted to the moulding characteristics of the finished component.

Another possibility of influencing the filament ejection during the production of the support layer is to vary the delivery of one or more extruders. If the delivery of the extruder is varied per unit of time during the mat layer, then it is also possible to adapt the properties of the support layer and hence of the mat to subsequent conditions.

Another way of controlling the mat properties is to provide the spinnerets with different nozzle apertures thus producing a support layer with filaments of different thicknesses.

Advantageously, the spinneret movements, extruder delivery and mat installation feed are adapted to one another by a programme control. In this case it is possible, without changes to the production plant, to make mats which satisfy the most diverse requirements in the optimum manner.

Another advantage of the method described is that prior art production plants of the kind described, for example in DAS No. 23 64 025 can be converted to the method according to the invention with no great expenditure.

The invention will be described now by way of example only with particular reference to the accompanying drawing wherein:

FIG. 1 is a diagram of an installation for making a mat in accordance with the present invention, and FIG. 2 is a diagrammatic plan view of the spinning system for making the support layer.

In the installation shown in FIG. 1, the support layer is produced by two spinneret bars moving in opposite directions. The installation includes a bunker 1 to receive the fibres, which have already had appropriate amounts of binder added. The fibres pass through a first feeder 2 with a valve 3, on to a rotating endless conveyor 4 and form the first fibre layer 5. A smoothing or peeling roller 6 with a suction extractor 7 evens out the layer 5 and adjusts its height. Roller 6 is immediately followed by the two spinneret bars 8, 8' (the associated extruders are not shown in FIG. 1).

Spinnerets 10 are disposed along the underside of the spinneret bars 8, 8'. Individual filaments 9' emerging from the spinnerets 10 are combined into a loop fabric 9 by the transverse movement of the spinneret bars in opposite directions, and this fabric forms the support layer to which the second fibre layer 16 is applied by means of the other feeder chute 12 and another valve 13. The second fibre layer is evened out by the smoothing or peeling roller 14 and suction extractor 15 before running through the pair of rollers **17*a* and 17*b*, which shapes the bonded layers into a pre-compacted endless strand 19. Strand 19 passes through the pair of profiled rollers 18*a* and 18*b*, which forms the finished fibre mat 20 therefrom, which is reeled on the drum 21**.

FIG. 2 shows the formation of the loops in the production of the support layer. The spinneret bars 8, 8' move in opposite directions as shown by the arrows and in so doing eject the loop fabric 9 on to the surface of the first layer 5. The extruders 11 and 11' supply the spinnerets with thermoplastic through the spinneret bars. The loop fabric 9 of the support layer is then coated with the second layer 16 before passing through the compacting rollers **17*a* and 17*b***.

I claim:

1. A fibre mat for the dry production of compressed mouldings, said mat comprising:

a first ligno-cellulose fibre layer;

a second ligno-cellulose fibre layer; and a support layer located between and bonded to said first and second fibre layers, said support layer being formed of intersecting discrete filaments in a loop configuration, said filaments being interconnected at the intersection points, said support layer being deformable in its planar dimensions, said planar deformability being determined by the sum of the loop deformations.

2. A fibre mat according to claim 1 wherein the interconnection between the discrete filaments at the points of mutual intersection and contact with fibres within said first and second layers is produced by frictional forces at the points of contact.

3. A fibre mat according to claims 1 or 2, characterized in that the shape and size of the loops of the support layer are variable.

4. A fibre mat according to claim 1 or 2, characterised in that the support layer consists of filaments of different thicknesses.

5. A fibre mat according to claims 1 or 2, characterised in that the support layer consists of prefabricated discrete filaments provided with an adhesive.

6. A fibre mat according to claims 1 or 2, characterised in that the discrete filaments of the support layer are disposed in overlapping loops.

7. A fibre mat according to claims 1 or 2, characterised in that the discrete filaments of the support layer extend substantially rectilinearly and intersect at any angle.

8. A fibre mat according to claims 1 or 2, characterised in that the support layer is prefabricated and provided with an adhesive.

* * * * *